US006872316B2

(12) United States Patent
Heikkilä et al.

(10) Patent No.: US 6,872,316 B2
(45) Date of Patent: Mar. 29, 2005

(54) RECOVERY OF XYLOSE

(75) Inventors: Heikki Heikkilä , Espoo (FI); Mika Mänttäri, Lappeenranta (FI); Mirja Lindroos, Kirkkonummi (FI); Marianne Nyström, Lappeenranta (FI)

(73) Assignee: Danisco Sweeteners Oy, Espoo (FI)

( * ) Notice: Subject to any disclaimer, the term of this patent is extended or adjusted under 35 U.S.C. 154(b) by 179 days.

(21) Appl. No.: 10/034,566

(22) Filed: Dec. 28, 2001

(65) Prior Publication Data

US 2002/0153317 A1 Oct. 24, 2002

(30) Foreign Application Priority Data

Dec. 28, 2000 (FI) ............................................ 20002865

(51) Int. Cl.[7] ............................................ B01D 61/00

(52) U.S. Cl. ....................... 210/652; 210/651; 210/653; 127/55; 162/55

(58) Field of Search ................................ 210/651, 652, 210/653, 659; 127/30, 37, 42, 58, 60, 61, 55; 426/2; 162/1, 55; 536/127; 435/105

(56) References Cited

U.S. PATENT DOCUMENTS

| | | | | |
|---|---|---|---|---|
| 4,511,654 A | | 4/1985 | Rohrbach et al. | |
| 4,631,129 A | | 12/1986 | Heikkila | |
| 5,637,225 A | | 6/1997 | Heikkila et al. | |
| 5,730,877 A | | 3/1998 | Heikkila et al. | |
| 5,869,297 A | * | 2/1999 | Binder et al. | 435/105 |
| 6,057,438 A | * | 5/2000 | Hyatt et al. | 536/127 |
| 6,086,681 A | * | 7/2000 | Lindroos et al. | 127/37 |
| 6,126,754 A | | 10/2000 | Duflot | |
| 6,329,182 B1 | * | 12/2001 | Pedersen et al. | 435/96 |
| 6,409,841 B1 | * | 6/2002 | Lombard | 127/37 |

FOREIGN PATENT DOCUMENTS

| | | |
|---|---|---|
| CA | 992266 | 7/1976 |
| WO | WO 96/27028 | 9/1996 |
| WO | WO 99/28490 | 6/1999 |
| WO | WO 02/053783 A1 * | 7/2002 |

* cited by examiner

*Primary Examiner*—Ana Fortuna
(74) *Attorney, Agent, or Firm*—Scully, Scott, Murphy & Presser

(57) ABSTRACT

The invention relates to a process of producing a xylose solution from a biomass hydrolysate by subjecting the biomass hydrolysate to nanofiltration and recovering as the nanofiltration permeate a solution enriched in xylose. The biomass hydrolysate used as starting material is typically a spent liquor obtained from a pulping process.

50 Claims, No Drawings

RECOVERY OF XYLOSE

BACKGROUND OF THE INVENTION

The invention relates to a novel process of recovering xylose from biomass hydrolysates, such as from a spent liquor obtained from a pulping process, typically from a spent liquor obtained from a sulphite pulping process.

Xylose is a valuable raw material in the sweets, aroma and flavoring industries and particularly as a starting material in the production of xylitol. Xylose is formed in the hydrolysis of xylan-containing hemicellulose, for example in the direct acid hydrolysis of biomass, in enzymatic or acid hydrolysis of a prehydrolysate obtained from biomass by prehydrolysis (with steam or acetic acid, for instance), and in sulphite pulping processes. Vegetable material rich in xylan include the wood material from various wood species, particularly hardwood, such as birch, aspen and beech, various parts of grain (such as straw and husks, particularly corn and barley husks and corn cobs and corn fibers), bagasse, cocoanut shells, cottonseed skins etc.

Xylose can be recovered by crystallization e.g. from xylose-containing solutions of various origin and purity. In addition to xylose, the spent sulphite pulping liquors contain, as typical components, lignosulphonates, sulphite cooking chemicals, xylonic acid, oligomeric sugars, dimeric sugars and monosaccharides (other than the desired xylose), and carboxylic acids, such as acetic acid, and uronic acids.

Before crystallization, it is as a rule necessary to purify the xylose-containing solution obtained as a result of the hydrolysis of cellulosic material to a required degree of purity by various methods, such as filtration to remove mechanical impurities, ultrafiltration, ion-exchange, decolouring, ion exclusion or chromatography or combinations thereof.

Xylose is produced in large amounts in pulp industry, for example in the sulphite cooking of hardwood raw material. Separation of xylose from such cooking liquors is described, for example, in U.S. Pat. No. 4,631,129 (Suomen Sokeri Oy). In this process, sulphite spent liquor is subjected to two-step chromatographic separation to form substantially purified fractions of sugars (e.g. xylose) and lignosulphonates. The first chromatographic fractionation is carried out using a resin in a divalent metal salt form, typically in a calcium salt form, and the second chromatographic fractionation is carried out using a resin in a monovalent metal salt form, such as a sodium salt form.

U.S. Pat. No. 5,637,225 (Xyrofin Oy) discloses a method for the fractionation of sulphite cooking liquor by a sequential chromatographic simulated moving bed system comprising at least two chromatographic sectional packing material beds, where at least one fraction enriched with monosaccharides and one fraction enriched with lignosulphonates is obtained. The material in the sectional packing material beds is typically a strongly acid cation exchange resin in $Ca^{2+}$ form.

U.S. Pat. No. 5,730,877 (Xyrofin Oy) discloses a method for fractionating a solution, such as a sulphite cooking liquor, by a chromatographic separation method using a system comprising at least two chromatographic sectional packing beds in different ionic forms. The material of the sectional packing bed of the first loop of the process is essentially in a divalent cation form, such as in $Ca^{2+}$ form, and in the last loop essentially in a monovalent cation form, such as in $Na^{+}$ form.

WO 96/27028 (Xyrofin Oy) discloses a method for the recovery of xylose by crystallization and/or precipitation from solutions having a comparatively low xylose purity, typically 30 to 60% by weight of xylose on dissolved dry solids. The xylose solution to be treated may be, for example, a concentrate chromatographically obtained from a sulphite pulping liquor.

It is also known to use membrane techniques, such as ultrafiltration to purify spent sulphite pulping liquors (e.g. Papermaking Science and Technology, Book 3: Forest Products Chemistry, p. 86, ed. Johan Gullichsen, Hannu Paulapuro and Per Stenius, Helsinki University of Technology, published in cooperation with the Finnish Paper Engineer's Association and TAPPI, Gummerus, Jyväskylä, Finland, 2000). High-molar-mass lignosulphonates can thus be separated by ultrafiltration from the low-molar-mass components, such as xylose.

It is thus known to use ultrafiltration to separate compounds having a large molar mass, such as lignosulphonates present in a sulphite spent liquor, from compounds having a small molar mass, such as xylose, whereby compounds having a large molar mass (lignosulphonates) are separated into the retentate and compounds having a small molar mass (xylose) are enriched into the permeate. Further enriching of xylose from e.g. salts is possible for example with chromatographic methods using ion exclusion.

Nanofiltration is a relatively new pressure-driven membrane filtration process, falling between reverse osmosis and ultrafiltration. Nanofiltration typically retains large and organic molecules with a molar mass greater than 300 g/mol. The most important nanofiltration membranes are composite membranes made by interfacial polymerisation. Polyether sulfone membranes, sulfonated polyether sulfone membranes, polyester membranes, polysulfone membranes, aromatic polyamide membranes, polyvinyl alcohol membranes and polypiperazine membranes are examples of widely used nanofiltration membranes. Inorganic and ceramic membranes can also be used for nanofiltration.

It is known to use nanofiltration for separating monosaccharides, such as glucose and mannose from disaccharides and higher saccharides. The starting mixture including monosaccharides, disaccharides and higher saccharides may be a starch hydrolysate, for example.

U.S. Pat. No. 5,869,297 (Archer Daniels Midland Co.) discloses a nanofiltration process for making dextrose. This process comprises nanofiltering a dextrose composition including as impurities higher saccharides, such as disaccharides and trisaccharides. A dextrose composition having a solids content of at least 99% dextrose is obtained. Crosslinked aromatic polyamide membranes have been used as nanofiltration membranes.

WO 99/28490 (Novo Nordisk AS) discloses a method for enzymatic reaction of saccharides and for nanofiltration of the enzymatically treated saccharide solution including monosaccharides, disaccharides, trisaccharides and higher saccharides. Monosaccharides are obtained in the permeate, while an oligosaccharide syrup containing disaccharides and higher saccharides is obtained in the retentate. The retentate including the disaccharides and higher saccharides is recovered. A thin film composite polysulfone membrane having a cut-off size less than 100 g/mol has been used as the nanofiltration membrane, for example.

U.S. Pat. No. 4,511,654 (UOP Inc.) relates to a process for the production of a high glucose or maltose syrup by treating a glucose/maltose-containing feedstock with an enzyme selected from amyloglucosidase and β-amylase to form a partially hydrolyzed reaction mixture, passing the resultant partially hydrolyzed reaction mixture through an ultrafiltration membrane to form a retentate and a permeate, recycling the retentate to the enzyme treatment stage, and recovering the permeate including the high glucose or maltose syrup.

U.S. Pat. No. 6,126,754 (Roquette Freres) relates to a process for the manufacture of a starch hydrolysate with a high dextrose content. In this process, a starch milk is subjected to enzymatic treatment to obtain a raw saccharified hydrolysate. The hydrolysate thus obtained is then subjected to nanofiltering to collect as the nanofiltration permeate the desired starch hydrolysate with a high dextrose content.

Separation of xylose from other monosaccharides, such as glucose by membrane techniques has not been disclosed in the state of the art.

BRIEF SUMMARY OF THE INVENTION

The purpose of the present invention is to provide a method of recovering xylose from a biomass hydrolysate, such as a spent liquor obtained from a pulping process. The process of the claimed invention is based on the use of nanofiltration.

In accordance with the present invention, complicated and cumbersome chromatographic or ion-exhange steps can be completely or partly replaced by less complicated nanofiltration membrane techniques. The process of the present invention provides a xylose solution enriched in xylose and free from conventional impurities of biomass hydrolysates, such as those present in a spent sulphite pulping liquor.

A more detailed explanation of the invention is provided in the following description and appended claims.

DETAILED DESCRIPTION OF THE INVENTION

A detailed description of preferred embodiments of the invention will now be explained.

The invention relates to a process of producing a xylose solution from a biomass hydrolysate or a part thereof. The process of the invention is characterized by subjecting said biomass hydrolysate to nanofiltration and recovering as the nanofiltration permeate a solution enriched in xylose.

The biomass hydrolysate useful in the present invention may be obtained from the hydrolysis of any biomass, typically xylan-containing vegetable material. The biomass hydrolysate can be obtained from the direct acid hydrolysis of biomass, from enzymatic or acid hydrolysis of a prehydrolysate obtained from biomass by prehydrolysis (with steam or acetic acid, for instance), and from sulphite pulping processes. Xylan-containing vegetable material include wood material from various wood species, particularly hardwood, such as birch, aspen and beech, various parts of grain (such as straw and husks, particularly corn and barley husks and corn cobs and corn fibers), bagasse, cocoanut shells, cottonseed skins etc.

The biomass hydrolysate used as starting material in the process of the invention may be also a part of a biomass hydrolysate obtained from hydrolysis of biomass-based material. Said part of a biomass hydrolysate may be a prepurified hydrolysate obtained e.g. by ultrafiltration or chromatography.

In the process of the present invention, a xylose solution having a xylose content of over 1.1 times, preferably over 1.5 times, most preferably over 2.5 times that of the starting biomass hydrolysate (based on the dry substance content) is obtained, depending e.g. on the xylose content and pH of the biomass hydrolysate and the nanofiltration membrane used. Typically, a xylose solution having a xylose content of or over 1.5 to 2.5 times that of the starting biomass hydrolysate (based on the dry substance content) is obtained, depending e.g. on the xylose content and pH of the biomass hydrolysate and the nanofiltration membrane used.

The biomass hydrolysate used for the recovery of xylose in accordance with the present invention is typically a spent liquor obtained from a pulping process. A typical spent liquor useful in the present invention is a xylose-containing spent sulphite pulping liquor, which is preferably obtained from acid sulphite pulping. The spent liquor may be obtained directly from sulphite pulping. It may also be a concentrated sulphite pulping liquor or a side-relief obtained from sulphite cooking. It may also be a xylose-containing fraction chromatographically obtained from a sulphite pulping liquor or a permeate obtained by ultrafiltration of a sulphite pulping liquor. Furthermore, a post-hydrolyzed spent liquor obtained from neutral cooking is suitable.

The spent liquor useful in the present invention is preferably obtained from hardwood pulping. A spent liquor obtained from softwood pulping is also suitable, preferably after hexoses have been removed e.g. by fermentation In the present invention, the spent liquor to be treated may also be any other liquor obtained from the digestion or hydrolysis of biomass, typically cellulosic material with an acid. Such a hydrolysate can be obtained from cellulosic material for example by treatment with an inorganic acid, such as hydrochloric acid, sulphuric acid or sulphur dioxide, or by treatment with an organic acid, such as formic acid or acetic acid. A spent liquor obtained from a solvent-based pulping, such as ethanol-based pulping may also be used.

The biomass hydrolysate used as starting material may have been subjected to one or more pretreatment steps. The pretreatment steps are typically selected from ion exchange, ultrafiltration, chromatography, concentration, pH adjustment, filtration, dilution, crystallization an combinations thereof.

The spent hardwood sulphite pulping liquor also contains other monosaccharides in a typical amount of 10 to 30%, based on the xylose content. Said other monosaccharides include e.g. glucose, galactose, rhamnose, arabinose and mannose. Xylose and arabinose are pentose sugars, whereas glucose, galactose, rhamnose and mannose are hexose sugars. Furthermore, the spent hardwood sulphite pulping liquor typically includes rests of pulping chemicals and reaction products of the pulping chemicals, lignosulphonates, oligosaccharides, disaccharides, xylonic acid, uronic acids, metal cations, such as calcium and magnesium cations, and sulphate and sulphite ions. The biomass hydrolysate used as starting material also contains rests of acids used for the hydrolysis of the biomass.

The dry substance content of the starting biomass hydrolysate, such as that of the spent liquor is typically 3 to 50% by weight, preferably 8 to 25% by weight.

The dry substance content of the starting biomass hydrolysate used as the nanofiltration feed is preferably less than 30% by weight.

The xylose content of the starting biomass hydrolysate may be 5 to 95%, preferably 15 to 55%, more preferably 15 to 40% and especially 8 to 27% by weight, based on the dry substance content.

The xylose content of the spent liquor to be treated is typically 10 to 40% by weight, based on the dry substance content. A spent liquor obtained directly from hardwood sulphite pulping has a typical xylose content of 10 to 20%, based on the dry substance content.

The process may also comprise one or more pretreatment steps. The pretreatment before the nanofiltration is typically selected from ion exchange, ultrafiltration, chromatography, concentration, pH adjustment, filtration dilution and combinations thereof. Before the nanofiltration, the starting liquor may thus be preferably pretreated by ultrafiltration or chromatography, for example. Furthermore, a prefiltering step to remove the solid substances can be used before the nanofiltration. The pretreatment of the starting liquor may also comprise concentration, e.g. by evaporation, and neutralization. The pretreatment may also comprise crystallization, whereby the starting liquor may also be a mother liquor obtained from the crystallization of xylose, for example.

The nanofiltration is typically carried out at a pH of 1 to 7, preferably 3 to 6.5, most preferably 5 to 6.5. The pH depends on the composition of the starting biomass hydrolysate and the membrane used for the nanofiltration and the stability of sugars or components to be recovered. If necessary, the pH of the spent liquor is adjusted to the desired value before nanofiltration using preferably the same reagent as in the pulping stage, such as $Ca(OH)_2$ or MgO, for example.

The nanofiltration is typically carried out at a pressure of 10 to 50 bar, preferably 15 to 35 bar. A typical nanofiltration temperature is 5 to 95° C. preferably 30 to 60° C. The nanofiltration is typically carried out with a flux of 10 to 100 $l/m^2h$.

The nanofiltration membrane used in the present invention can be selected from polymeric and inorganic membranes having a cut-off size of 100–2500 g/mol, preferably 150 to 1000 g/mol, most preferably 150 to 500 g/mol.

Typical polymeric nanofiltration membranes useful in the present invention include, for example, polyether sulfone membranes, sulfonated polyether sulfone membranes, polyester membranes, polysulfone membranes, aromatic polyamide membranes, polyvinyl alcohol membranes and polypiperazine membranes and combinations thereof. Cellulose acetate membranes are also useful as nanofiltration membranes in the present invention.

Typical inorganic membranes include $ZrO_2$- and $Al_2O_3$-membranes, for example.

Preferred nanofiltration membranes are selected from sulfonated polysulfone membranes and polypiperazine membranes. For example, specific useful membranes are: Desal-5 DK nanofiltration membrane (manufacturer Osmonics) and NF-200 nanofiltration membrane (manufacturer Dow Deutschland), for example.

The nanofiltration membranes which are useful in the present invention may have a negative or positive charge. The membranes may be ionic membranes, i.e. they may contain cationic or anionic groups, but even neutral membranes are useful. The nanofiltration membranes may be selected from hydrophobic and hydrophilic membranes.

The typical form of nanofiltration membranes is a flat sheet form. The membrane configuration may also be selected e.g. from tubes, spiral membranes and hollow fibers. "High shear" membranes, such as vibrating membranes and rotating membranes can also be used.

Before the nanofiltration procedure, the nanofiltration membranes may be pretreated with alkaline detergents or ethanol, for example.

In a typical nanofiltration operation, the liquor to be treated, such as a spent liquor is fed through the nanofiltration membrane using the temperature and pressure conditions described above. The liquor is thus fractionated into a low molar mass fraction including xylose (permeate) and a high molar mass fraction including the non-desired components of the spent liquor (retentate).

The nanofiltration equipment useful in the present invention comprises at least one nanofiltration membrane element dividing the feed into a retentate and permeate section. The nanofiltration equipment typically also include means for controlling the pressure and flow, such as pumps and valves and flow and pressure meters. The equipment may also include several nanofiltration membrane elements in different combinations, arranged in parallel or series.

The flux of the permeate varies in accordance with the pressure. In general, at a normal operation range, the higher the pressure, the higher the flux. The flux also varies with the temperature. An increase of the operating temperature increases the flux. However, with higher temperatures and with higher pressures there is an increased tendency for a membrane rupture. For inorganic membranes, higher temperatures and pressures and higher pH ranges can be used than for polymeric membranes.

The nanofiltration in accordance with the present invention can be carried out batchwise or continuously. The nanofiltration procedure can be repeated once or several times. Recycling of the permeate and/or the retentate back to the feed vessel (total recycling mode filtration) can also be used.

After nanofiltration, the xylose may be recovered from the permeate, e.g. by crystallization. The nanofiltered solution can be used as such for the crystallization, without further purification and separation steps. If desired, the nanofiltered xylose-containing liquor can be subjected to further purification, e.g. by chromatography, ion exchange, concentration e.g. by evaporation or reverse osmosis, or colour removal. The xylose may also be subjected to reduction, e.g. by catalytic hydrogenation, to obtain xylitol.

The process may also comprise a further step of recovering a solution rich in lignosulphonates, oligosaccharides, hexoses and divalent salts as the retentate.

In accordance with the present invention, the solution enriched in xylose and recovered as the permeate may also include other pentoses, such as arabinose. Said hexoses recovered in the retentate may comprise one or more of glucose, galactose, rhamnose and mannose.

The present invention also provides a method of regulating the xylose content of the permeate by regulating the dry substance content of the biomass hydrolysate, such as a spent liquor.

Furthermore, the invention relates to the use of the xylose solution thus obtained for the preparation of xylitol. Xylitol is obtained by reducing the xylose product obtained, e.g. by catalytic hydrogenation.

Preferred embodiments of the invention will be described in greater detail by the following examples, which are not construed as limiting the scope of the invention.

In the examples and throughout the specification and claims, the following definitions have been used:

DS refers to the dry substance content measured by Karl Fischer titration, expressed as % by weight.

RDS refers to the refractometric dry substance content, expressed as % by weight.

Flux refers to the amount (liters) of the solution that permeates through the nanofiltration membrane during one hour calculated per one square meter of the membrane surface, $l/(m^2h)$.

Fouling refers to the percentage difference in the flux values of pure water measured before and after the nanofiltration:

$$\text{fouling }(\%)=[(PWFb-PWFa)/PWFb]\times 100,$$

where PWFb is the flux of pure water before the nanofiltration of the xylose solution and PWFa is the flux of pure water after the nanofiltration of xylose solution under the same pressure.

Retention refers to the proportion of the measured compound retained by the membrane. The higher the retention value, the less is the amount of the compound transferred through the membrane:

$$\text{Retention}(\%)=[(\text{Feed}-\text{Permeate})/\text{Feed}]\times 100,$$

where "Feed" refers to the concentration of the compound in the feed solution (expressed e.g. in g/l) and "Permeate"

refers to the concentration of the compound in the permeate solution (expressed e.g. in g/l).

HPLC (for the determination of carbohydrates) refers to liquid chromatography. The carbohydrates (monosaccharides) have been measured using HPLC with $Pb^{2+}$ form ion exchange column and RI detection, disaccharides using HPLC with $Na^{+}$ form ion exchange column and xylonic acid using HPLC with anion exchange column and PED detection.

Colour (where determined) was measured by an adapted ICUMSA method at pH 5.

The following membranes were used in the examples:

Desal-5 DK (a four-layered membrane consisting of a polyester layer, a polysulfone layer and two proprietary layers, having a cut-off size of 150 to 300 g/mol, permeability (25° C.) of 5.4 l(m$^2$h bar) and $MgSO_4$-retention of 98% (2 g/l), manufacturer Osmonics), Desal-5 DL (a four-layered membrane consisting of a polyester layer, a polysulfone layer and two proprietary layers, having a cut-off size of 150 to 300 g/mol, permeability (25° C.) of 7.6 l/(m$^2$h bar), $MgSO_4$-retention of 96% (2 g/l), manufacturer Osmonics), NTR-7450 (a sulfonated polyethersulfone membrane having a cut-off size of 500 to 1000 g/mol, permeability (25° C.) of 9.4 l/(m$^2$h bar), NaCl-retention of 51% (5 g/l), manufacturer Nitto Denko), and NF-200 (a polypiperazine membrane having a cut-off size of 200 g/mol, permeability (25° C.) of 7–8 l(m$^2$h bar), NaCl-retention of 70%, manufactuer Dow Deutschland).

EXAMPLE I

Nanofiltration of a Spent Suphite Pulping Liquor Using Various Membranes at Various pH Values This example illustrates the effect of the membrane and pH on the performance of nanofiltration (filtrations C1, C3, C6 and C8). The liquor to be treated was a diluted runoff of the crystallization of a Mg-based sulphite spent pulping liquor obtained from beechwood pulping, which had been chromatographically purified using an ion exchange resin in $Mg^{2+}$ form. The pH of the solution was adjusted to the desired value (see Table I) with MgO. Before the nanofiltration, the liquor was pretreated by dilution (filtrations C1 and C3), by filtration through a filter paper (filtration C6) or with MgO dosing combined with filtration through a filter paper (filtrations C7 and C8).

A batch mode nanofiltration was carried out using a laboratory nanofiltration equipment consisting of rectangular cross-flow flat sheet modules with a membrane area of 0.0046 m$^2$. Both the permeate and the retentate were recycled back to the feed vessel (total recycling mode filtration). The feed volume was 20 liters. During the filtration, the cross-flow velocity was 6 m/s and the pressure was 18 bar. The temperature was kept at 40° C.

Table I presents the results of the total recycling mode filtrations. The flux values in Table I were measured after 3 hours of filtration. Table I shows the dry substance content (DS) in the feed (%), the xylose content in the feed and in the permeate (based on the dry substance content), the permeate flux at a pressure of 18 bar and the flux reduction caused by fouling. The membranes were Desal-5 DK and NTR-7450.

TABLE I

| Filtration No., membrane | PH | DS in the feed, w-% | Xylose in feed, % on DS | Xylose in permeate, % on RDS | Flux l/(m$^2$h) | Fouling, % |
|---|---|---|---|---|---|---|
| C1, Desal-5-DK | 3.4 | 8.1 | 22.6 | 27.4 | 31 | 1 |
| C6* Desal-5-DK | 3.4 | 9.7 | 20.3 | 33.5 | 23 | 1 |
| C7* Desal-5-DK | 5.9 | 8.2 | 21.7 | 55.2 | 58 | 3 |
| C3, NTR-7450 | 3.4 | 7.6 | 24.3 | 29.9 | 25 | 29 |
| C8, NTR-7450 | 6.1 | 8.3 | 21.8 | 34.5 | 43 | 25 |
| C8, Desal-5-DK | 6.1 | 8.3 | 21.8 | 45 | 30 | 1 |

*average value of two membranes

The results of Table I show that nanofiltration provides xylose concentrations centrations of 1.5 to 2.5 times those of the feed. When the pH in the feed is high, the xylose content on RDS in the permeate is high. The xylose content on RDS in the permeate is high for example when pH is 5.9 or 6.1. Furthermore, the flux was improved even to two-fold at higher pH values. The Desal-5 DK membrane at a high pH provided the best results.

EXAMPLE II

Nanofiltration at Various Temperatures

The effect of the temperature was studied using the same equipment and the same spent liquor solution as in Example 1. The temperature during the nanofiltration was raised from 25° C. to 55° C. The membrane was Desal-5 DK, and the nanofiltration conditions were the following: pH 3.4, pressure 16 bar, cross-flow velocity 6 m/s, DS 7.8%. The feed concentration and pressure were kept constant during the experiment.

Table II shows the xylose contents in the feed and in the permeate, based on the dry substance content (permeate values are average values of two membranes).

TABLE II

| Temperature, ° C. | Xylose in feed, % on DS | Xylose in permeate, % on RDS |
|---|---|---|
| 25 | 24.5 | 23.8 |
| 40 | 24.5 | 29.9 |
| 55 | 24.6 | 34.6 |

The results of Table II show that the higher the temperature, the higher concentrations of xylose can be obtained.

EXAMPLE III

(A) Pretreatment with Ultrafiltration

Concentration mode ultrafiltrations DU1 and DU2 were carried out using an RE filter (rotation-enhanced filter). In this filter, the blade rotates near the membrane surface minimizing the concentration polarization during the filtration. The filter was a home-made cross-rotational filter. The rotor speed was 700 rpm. In filtration DU1, the membrane was C5F UF (a membrane of regenerated cellulose having a cut-off size of 5000 g/mol, manufacturer Hoechst/Celgard). In filtration DU2, the membrane was Desal G10 (a thin film membrane having a cut-off size of 2500 g/mol, manufacturer Osmonics/Desal).

Concentration mode filtrations were made using a Mg-based sulphite phite spent pulping liquor obtained from beechwood pulping. The filtration was carried out at a temperature of 35° C. and a pH of 3.6. The results are presented in Table IIIa.

TABLE IIIa

| Filtration No. | Membrane | DS in feed, % | Filtration time | Xylose in feed, % on DS | Xylose in permeate, % on RDS |
|---|---|---|---|---|---|
| DU1 | C5F | 14.4 | 1 hour | 16.3 | 23.2 |
| DU1 | C5F | 22.0 | 23 hours | 9.2 | 20.0 |
| DU2 | Desal G10 | 12.2 | 3 days | 12.7 | 41.6 |

(B) Nanofiltration

A one-day laboratory-scale experiment where the permeate was collected out was carried out with the same equipment as in Example 1 (filtrations DN1 and DN2). The liquor to be treated was a Mg-based sulphite spent pulping liquor obtained from beechwood pulping.

In filtration DN1, the ultrafiltered spent liquor (DU1 using a C5F membrane) was used as the feed solution. The pH of the solution was adjusted to 4.5 using MgO, and the liquor was prefiltered through a filter paper before nanofiltration. Nanofiltration was carried out at a pressure of 19 bar and at a temperature of 40° C.

Filtration DN2 was carried out using the diluted original spent liquor. Its pH had been adjusted to 4.8 and the solution was prefiltered through a filter paper before nanofiltration. The nanofiltration was carried out at a pressure of 17 bar and at a temperature of 40° C. After about 20 hours of filtration, a permeate volume of 5 liters and a concentrate volume of 20 liters were obtained.

Both filtrations DN1 and DN2 were carried out at a cross-flow velocity of 6 m/s. Fouling was about 1% in both filtrations. The nanofiltration membrane in both filtrations was Desal-5 DK.

In each filtration DN1 and DN2, the nanofiltration membrane was pretreated in three different ways: (1 ) no pretreatment, (2) washing the membrane with ethanol, and (3) washing the membrane with an alkaline detergent.

The results are set forth in Table IIIb:

TABLE IIIb

| Filtration | PH | DS in feed, % | Xylose in feed, % on DS | Xylose in permeate, % on RDS (1)/(2)/(3) | Flux, l/(m$^2$h) at 20 h |
|---|---|---|---|---|---|
| DN1 | 4.5 | 10.7 | 21.1 | 24/35/49 | 14 (19 bar) |
| DN2 | 4.6 | 12.3 | 16.8 | N.A.*/35/34 | 22/32 (17/19 bar) |

*(N.A. = not analyzed)

The results of Table IIIb show that the proportion of xylose in the dry solids of the permeate obtained from the nanofiltration was somewhat changed when ultrafiltration was used as a pretreatment step. On the other hand, washing the membrane with ethanol or an alkaline detergent increased the xylose content considerably.

EXAMPLE IV

Nanofiltration at Various Pressures

Experiment DS1 was carried out using DSS Labstak® M20-filtering equipment operating with total recycling mode filtration (manufacturer Danish Separation Systems AS, Denmark). The liquor to be treated was the same as in Example III. The temperature was 35° C. and the flow rate was 4.6 l/min. The membrane was Desal-5 DK. Before the experiments, the pH of the spent liquor was adjusted to 4.5 and the liquor was prefiltered through a filter paper.

The results are shown in Table IVa.

TABLE IVa

| Filtration | Pressure | DS in feed, % on DS | Xylose in feed, % on DS | Xylose in permeate, % on RDS | Flux, l/(m$^2$h) |
|---|---|---|---|---|---|
| DS1 | 22 bar | 11.4 | 17.3 | 24.5 | 18 |
| | 35 bar | 12.1 | 16.5 | 20.9 | 42 |

Further experiments (filtrations DV1 and DV2) were carried out using a V ◇ SEP filter (manufacturer New Logic), which is a high shear rate filter. Its efficiency is based on vibrating motion that causes a high shear force on the membrane surface. In filtration DV1, the feed concentration has been increased during the filtration by adding new concentrated feed to the vessel. At the same time the pressure was also increased. Table V shows the xylose content based on the dry solids contents in the feed and in the permeate at two feed dry solids concentrations.

TABLE IVb

| Filtration | DS in feed, % | Pressure, bar | Xylose in feed, % on DS | Xylose in permeate, % on RDS | Flux, l/(m$^2$h) |
|---|---|---|---|---|---|
| DV1 | 11 | 21 | 16 | 20 | 75 |
| DV2 | 21 | 35 | 16 | 42 | 22 |

It can be seen from the results of Tables IVa and IVb that a simultaneous increase of the nanofiltration pressure and the dry substance content of the feed increased the xylose content of the permeate.

EXAMPLE V

Nanofiltration at Various Values of the Feed Dry Solids

The liquor to be treated was the ultrafiltered liquor from filtration DU2 of Example III (the ultrafiltration had been carried out with Desal G10 membrane from Osmonics/Desal). The nanofiltration was carried out at a pressure of 30 bar, a temperature of 35° C. and a pH of 5.3). The nanofiltration membranes were Desal-5 DK, Desal-5 DL and NF 200.

The effect of feed dry solids content on the membrane performance is presented in Table V.

TABLE V

| DS in feed, % | Xylose in feed, % on DS | Xylose in permeate, % on DS Desal-5DK | Desal-5 DL | NF 200 |
|---|---|---|---|---|
| 5.6 | 33.2 | 31 | 26 | 42 |
| 10.3 | 32.5 | 42 | 35 | 60 |
| 18.5 | 29.8 | 69 | 65 | 64 |

For comparative purposes, the contents of other carbohydrates (in addition to xylose), oligosaccharides, xylonic acid, metal cations ($Ca^{2+}$ and $Mg^{2+}$) as well as sulphite and sulphate ions were analyzed from samples taken from a concentration mode ultrafiltration (DS4) at three different concentrations (the feed samples) and from the corresponding permeates obtained from nanofiltration with three different nanofiltration membranes (the permeate samples).

The results are set forth in Table Va. In Table Va, sample numbers A, B and C refer to samples taken from the feed (liquor ultrafiltered with Desal G10 membrane) in a concentration mode filtration at three different dry substance contents (DS) of 5.6, 10.3 and 18.5, sample numbers D, E and F refer to corresponding samples taken from the permeate obtained from nanofiltration with a Desal 5DK membrane, sample numbers G, H and I refer to corresponding samples taken from the permeate obtained from nanofiltration with a Desal-5 DL membrane, and sample numbers J, K and L refer to the corresponding samples taken from the permeate obtained from nanofiltration with a NF 200 membrane.

In Table Va, the contents of carbohydrates were analyzed using HPLC with $Pb^{2+}$ form ion exchange column and RI detection, disaccharides using HPLC with $Na^{+}$ form ion exchange column and the contents of xylonic acid using HPLC with anion exchange column and PED detection.

Furthermore, Table Vb shows the carbohydrate contents and some other analytical results of the feed liquid at a dry substance content of 18.5% (sample C above) and of the corresponding permeate samples (samples F, I and L above) (ultrafiltration as the pretreatment step; the nanofiltering conditions: 35° C., 30 bar, pH 5,3, DS in the feed 18.5%, DSS LabStak® M20).

TABLE Va

| | A DS4. S1 | B DS4. S2 | C DS4. S3 | D DS4. DK1 | E DS4. DK2 | F DS4. DK3 | G DS4. DL1 | H DS4. DL2 | I DS4. DL3 | J DS4. NF1 | K DS4. NF2 | L DS4. NF3 |
|---|---|---|---|---|---|---|---|---|---|---|---|---|
| Carbohydrates, % on DS | | | | | | | | | | | | |
| glucose | 3.0 | 3.8 | 3.9 | 1 | 1.4 | 2.8 | 1 | 1 | 1.9 | 2 | 3 | 3.9 |
| xylose | 33.2 | 32.5 | 29.8 | 31 | 42 | 69 | 26 | 35 | 65 | 42 | 60 | 64.0 |
| galactose + rhamnose | 1.9 | 1.9 | 1.9 | 0.7 | 1.0 | 1.6 | 0.7 | 0.9 | 1.5 | 1 | 1.5 | 2.1 |
| arabinose | 0.3 | 0.3 | 0.3 | 0.3 | 0.3 | 0.6 | n.a. | 0.3 | 0.7 | 0.5 | 0.6 | 0.5 |
| mannose | 3.2 | 3.2 | 3.3 | 1 | 1.5 | 2.7 | 1 | 1.5 | 2.6 | 2 | 3 | 3.2 |
| Disaccharides, % on DS | 0.5 | 0.5 | 0.5 | n.d. | 0.2 | n.d. | n.d. | n.d. | 0.1 | n.d. | n.d. | n.d. |
| Xylonic acid, % on DS | 11.5 | 11.6 | 12.7 | 5 | 5 | 4 | 5 | 5 | 5 | 5 | 5 | 4.1 |
| Metals (ICP), % on DS | | | | | | | | | | | | |
| Ca | 0.12 | 0.11 | 0.11 | 0.7 | 0.4 | 0.1 | 0.7 | 0.5 | 0.1 | 0.4 | 0.3 | 0.1 |
| Mg | 2.1 | 4.0 | 4.6 | 0.5 | 0.4 | 0.04 | 0.9 | 0.9 | 0.3 | 2.1 | 2.6 | 2.5 |
| Sulphite (IC), % on DS | 0.51 | 0.62 | 0.59 | 0.4 | 0.3 | 0.5 | 0.5 | 0.4 | 0.6 | 0.3 | 0.6 | 0.9 |
| Sulphate (IC), % on DS | 2.9 | 3.2 | 3.8 | 0.2 | 0.2 | 0.1 | 1 | 0.8 | 0.5 | 0.6 | 0.5 | 0.4 |

n.a. = not analyzed
n.d. = not detected

TABLE Vb

| | Feed | Permeate | | |
|---|---|---|---|---|
| | UF permeate (sample C) | Desal-5 DK (sample F) | Desal-5 DL (sample I) | NF-200 (sample L) |
| PH | 5.4 | 4.8 | 4.9 | 5.2 |
| Conductivity, mS/cm | 13.1 | 2.2 | 2.8 | 4.5 |
| ColourI | 99300 | 7050 | 12200 | 7540 |
| UV 280 nm, 1/cm | 350 | 17 | 16 | 18 |
| Xylose, % on DS | 29.8 | 69.0 | 65.0 | 64.0 |
| Glucose, % on DS | 3.9 | 2.8 | 1.9 | 3.9 |
| Xylonic acid, | 12.7 | 4.0 | 5 | 4.1 |

TABLE Vb-continued

| | Feed | Permeate | | |
|---|---|---|---|---|
| | UF permeate (sample C) | Desal-5 DK (sample F) | Desal-5 DL (sample I) | NF-200 (sample L) |
| % on DS | | | | |
| $Mg^{2+}$, % on DS | 4.6 | 0.04 | 0.3 | 2.5 |
| $SO_4^{2-}$, % on DS | 3.8 | 0.1 | 0.5 | 0.4 |

Tables Va and Vb show that nanofiltration effectively concentrated pentoses, such as xylose and arabinose in the permeate, while removing an essential amount of disaccharides, xylonic acid, magnesium and sulphate ions from the xylose solution. Hexoses, such as glucose, galactose, rhamnose and mannose were not concentrated in the permeate.

The purity of xylose solutions can thus be effectively increased by nanofiltration. Furthermore, nanofiltration demineralizes the spent liquor by removing 98% of the divalent ions.

EXAMPLE VI

Nanofiltration of Spent Liquor in Pilot Scale 340 kg of Mg-based sulphite spent pulping liquor was diluted with water to give 1600 I of a solution with DS of 17%. The pH of the solution was adjusted with MgO from pH 2.6 to pH 5.4. The solution was filtered with Seitz filter using 4 kg of Arbocell® as filtering aid. Nanofiltration was carried using an equipment with Desal 5 DK3840 modules and an inlet pressure of 35 bar at 45° C. The nanofiltration permeate containing xylose was collected into a container until the flux of the permeate was reduced to a value below 10 $l/m^2/h$. The collected permeate (780 l) was concentrated with an evaporator to 13.50 kg of a solution with DS of 64%. Table VI presents the composition of the feed and the permeate. The contents of carbohydrates, acids and ions are expressed in % on DS.

TABLE VI

| | Feed | Permeate |
|---|---|---|
| PH | 5.0 | 5.2 |
| DS, g/100 g | 17.3 | 64.5 |
| Xylose | 12.5 | 64.8 |
| Glucose | 1.9 | 3.2 |
| Galactose + rhamnose | 1.2 | 2.3 |
| Arabinose + mannose | 1.3 | 3.0 |
| Xylonic acid | 3.7 | 3.2 |
| Acetic acid | 1.4 | 3.7 |
| $Na^+$ | 0.0 | 0.1 |
| $K^+$ | 0.2 | 3.1 |
| $Ca^{2+}$ | 0.1 | 0.0 |
| $Mg^{2+}$ | 2.7 | 0.5 |
| $SO_3^-$ | <0.5 | 0.5 |
| $SO_4^{2-}$ | 2.1 | 0.6 |

EXAMPLE VII

Nanofiltration Using Chromatography as Pretreatment and Crystallization as Post-treatment (A) Pretreatment with Chromatography Sulphite cooking liquor from a $Mg^{2+}$ based cooking process was subjected to a chromatographic separation process with the aim to separate xylose therefrom.

The equipment used for the chromatographic separation included four columns connected in series, a feed pump, circulation pumps, an eluent water pump as well as inlet and product valves for the various process streams. The height of each column was 2.9 m and each column had a diameter of 0.2 m. The columns were packed with a strong acid gel type ion exchange resin (Finex CS13GC) in $Mg^{2+}$ form. The average bead size was 0.36 mm and the divinylbenzene content was 6.5%.

The sulphite cooking liquor was filtered using diatomaceous earth and diluted to a concentration of 48% by weight. The pH of the liquor was 3.3. The sulphite cooking liquor was composed as set forth in Table VIIa below.

TABLE VIIa

| Composition of the feed | % on DS |
|---|---|
| Xylose | 13.9 |
| Glucose | 1.9 |
| Galactose + rhamnose | 1.4 |
| Arabinose + mannose | 1.9 |
| Xylonic acid | 4.5 |
| Others | 76.4 |

The chromatographic fractionation was carried out using a 7-step SMB sequence as set forth below. The feed and the eluent were used at a temperature of 70° C. Water was used as the eluant.

Step 1: 9 l of feed solution were pumped into the first column at a flow rate of 120 l/h, firstly 4 l of the recycle fraction and then 5 l of the xylose fraction were collected from column 4.

Step 2: 23.5 l of the feed solution were pumped into the first column at a flow rate of 120 l/h and a residual fraction was collected from the same column. Simultaneously 20 l of water were pumped into the second column at a flow rate of 102 l/h and a residual fraction was collected from column 3. Simultaneously also 12 l of water were pumped into column 4 at a flow rate of 60 l/h and a xylose fraction was collected from the same column.

Step 3: 4 l of feed solution were pumped into the first column at a flow rate of 120 l/h and a residual fraction was collected from column 3. Simultaneously 5.5 l of water were pumped into column 4 at a flow rate of 165 l/h and a recycle fraction was collected from the same column.

Step 4: 28 l were circulated in the column set loop, formed with all columns, at a flow rate of 130 l/h.

Step 5: 4 l of water were pumped into column 3 at a flow rate of 130 l/h and a residual fraction was collected from the second column.

Step 6: 20.5 l of water were pumped into the first column at a flow rate of 130 l/h and a residual fraction was collected from column 2. Simultaneously 24 of water were pumped into column 3 at a flow rate of 152 l/h and a residual fraction was collected from column 4.

Step 7: 23 l were circulated in the column set loop, formed with all columns, at a flow rate of 135 l/h.

After the system had reached equilibrium, the following fractions were drawn from the system: residual fractions from all columns, a xylose containing fraction from column 4 and two recycle fractions from column 4. Results including HPLC analyses for the combined fractions are set forth below. The contents of carbohydrates are expressed as % on DS.

TABLE VIIb

| Fraction | Xylose | Residual | Recycle |
|---|---|---|---|
| Volume, I | 17 | 96 | 9.5 |
| DS, g/100 ml | 23.8 | 16.4 | 21.7 |
| Xylose | 50.4 | 1.2 | 45.7 |
| Glucose | 4.8 | 0.9 | 4.2 |
| Galactose + rhamnose | 4.7 | 0.2 | 4.4 |
| Arabinose + mannose | 5.9 | 0.4 | 5.8 |
| Xylonic acid | 6.9 | 3.5 | 7.8 |
| Others | 27.3 | 93.8 | 32.1 |
| PH | 3.7 | 3.6 | 3.9 |

The overall xylose yield calculated from these fractions was 91.4%.

(B) Nanofiltration of the Xylose Fraction 325 kg of the xylose fraction obtained from the chromatographic separation above was diluted with water to give 2000 l of a solution with DS of 14%. The pH of the solution was raised with MgO from pH 3.7 to 4.9 and the solution was heated to 45° C. The heated solution was filtered with Seitz filter using 4 kg of Arbocell® as filtering aid. The clear solution was nanofiltered with Desal 5 DK3840 modules, using an inlet pressure of 35 bar at 45° C. During nanofiltration the permeate was collected into a container and the concentration was continued until the permeate flux decreased to a value below 10 l/m2/h. The collected permeate (750 l) was concentrated with an evaporator to 18.5 kg of a solution with DS of 67%. Table VIIc presents the composition of the feed and the evaporated permeate. The contents of carbohydrates, acids and ions are expressed in % on DS.

TABLE VIIc

| | Feed | Permeate |
|---|---|---|
| pH | 4.9 | 4.6 |
| DS, g/100 g | 13.5 | 67.7 |
| Xylose | 50.4 | 76.0 |
| Glucose | 4.1 | 2.0 |
| Galactose + rhamnose | 4.7 | 2.5 |
| Arabinose + mannose | 5.9 | 3.9 |
| Xylonic acid | 6.9 | 3.6 |
| Acetic acid | 1.6 | 0.6 |
| $Na^+$ | 0.0 | 0.0 |
| $K^+$ | 0.1 | 0.6 |
| $Ca^{2+}$ | 0.1 | 0.0 |

TABLE VIIc-continued

| | Feed | Permeate |
|---|---|---|
| $Mg^{2+}$ | 2.0 | 0.2 |
| $SO_4^{2-}$ | 2.3 | 0.1 |

(C) Post-treatment with Crystallization

The nanofiltration permeate obtained above was subjected to crystallization to crystallize the xylose contained therein. 18.5 kg of the permeate obtained in step (B) (about 11 kg DS) was evaporated with rotavapor (Bücchi Rotavapor R-153) to DS of 82%. The temperature of the rotavapor bath was 70 to 75° C. during the evaporation. 12.6 kg of the evaporated mass (10.3 kg DS) was put into a 10-liter cooling crystallizer. The jacket temperature of the crystallizer was 65° C. A linear cooling program was started: from 65° C. to 35° C. in 15 hours. Thereafter the cooling program was continued from 34° C. to 30° C. in 2 hours, because of the thin mass. In the final temperature (30° C.) the xylose crystals were separated by centrifugation (with Hettich Roto Silenta II centrifuge; basket diameter 23 cm; screen openings 0.15 mm) at 3500 rpm for 5 minutes. The crystal cake was washed by spraying with 80 ml water.

High quality crystals were obtained in the centrifugation. The cake had high DS (100%), high xylose purity (99.8% on DS) and low colour (64). The centrifugation yield was 42% (DS from DS) and 54% (xylose from xylose).

Part of the crystal cake was dried in an oven at 55° C. for 2 hours. The average crystal size was determined by sieve analysis to be 0.47 mm (CV% 38).

Table VIId presents the weight of the crystal mass introduced into the centrifuge and the weight of the crystal cake after the centrifugation. The table also gives the DS and the xylose purity of the final crystallization mass, the crystal cake as well as the run-off fraction.

For comparison purposes, Table VIIe also presents the corresponding values for glucose, galactose, rhamnose, arabinose, mannose and oligosaccharides.

with MgO to pH 4.2 and the solution was heated to 45° C. The heated solution was filtered with Seitz filter using 4 kg of Arbocell® as filtering aid. The clear solution was nanofiltered with Desal 5 DK3840 modules, using an inlet pressure of 35 bar at 45° C. During nanofiltration the permeate was collected into a container and the concentration was continued until the permeate flux was decreased to a value below 10 l/m$^2$/h. The collected permeate (630 l) was concentrated with an evaporator to 19.9 kg of a solution with DS of 60%. Table VIII presents the composition of the feed and the evaporated permeate. The contents of the components (carbohydrates and ions) are expressed in % on DS.

TABLE VIII

| | Feed | Permeate |
|---|---|---|
| pH | 4.2 | 3.5 |
| DS, g/100 g | 16.3 | 63.4 |
| Xylose | 20.5 | 48.3 |
| Glucose | 5.8 | 3.8 |
| Galactose + rhamnose | 5.0 | 3.8 |
| Arabinose + mannose | 6.8 | 6.1 |
| Xylonic acid | 13.6 | 14.0 |
| $Na^+$ | 0.0 | 0.0 |
| $K^+$ | 0.2 | 1.3 |
| $Ca^{2+}$ | 0.1 | 0.0 |
| $Mg^{2+}$ | 3.0 | 0.2 |
| $SO_3^-$ | <0.1 | 0.3 |
| $SO_4^{2-}$ | 3.6 | 0.3 |

The foregoing general discussion and experimental examples are only intended to be illustrative of the present invention, and not to be considered as limiting. Other variations within the spirit and scope of this invention are possible and will present themselves to those skilled in the art.

What is claimed is:

1. A process of producing a xylose solution from a hydrolysate of a xylan-containing vegetable material comprising subjecting said hydrolysate to nanofiltration and recovering as a nanofiltration permeate a solution enriched in xylose.

TABLE VIId

| Centrifugation Tests | Mass into centrifuge g | Washing ml | Washing % on $DS_{cake}$ | Cake g | Thickness of cake cm | Mass DS w-% | Mass purity % on DS | Cake DS w-% | Cake purity % on DS | Run-off purity % on DS | Yields DS/DS | Yields xylose/xylose % |
|---|---|---|---|---|---|---|---|---|---|---|---|---|
| Centrifugation | 922 | 80 | 26 | 313 | 1.0 | 81.8 | 76.8 | 100.0 | 99.8 | 60.6 | 42 | 54 |

TABLE VIIe

| Sample name | DS w-% | pH (of 30–50 w-% solution) | Colour | Carbohydrates Glucose % on DS | Carbohydrates Xylose % on DS | Carbohydrates Gal + Ram % on DS | Carbohydrates Arab. + mannose % on DS | Na+ column Oligosaccharides % on DS |
|---|---|---|---|---|---|---|---|---|
| Start of cooling | 81.5 | 4.0 | 7590 | 2.2 | 77.8 | 3.0 | 4.2 | 0.0 |
| Cake, 80 ml wash | 100.2 | 4.3 | 64 | 0.3 | 99.8 | 0.0 | 0.0 | 0.0 |
| Run-off, 80 ml wash | 64.8 | 4.1 | 15100 | 3.6 | 60.6 | 4.6 | 7.3 | 0.0 |

EXAMPLE VIII

Nanofiltration of the Mother Liquor Obtained from the Crystallization of Xylose 300 kg of mother liquor from the precipitation crystallization of xylose was diluted with water to give 2500 1 of a solution with DS of 16%. The pH of the solution was raised

2. A process as claimed in claim 1, comprising recovering as a retentate a solution including lignosuiphonates, oligosaccharides, hexose sugars and divalent salts.

3. A process as claimed in claim 2, wherein said hexoses recovered in the nanofiltration retentate comprise one or more of glucose, galactose, rhamnose and mannose.

4. A process as claimed in claim 1, comprising recovering as the nanofiltration permeate a xylose solution having a xylose content of over 1.1 times that of the hydrolysate, based on dry substance content.

5. A process as claimed in claim 4, comprising recovering a xylose solution having a xylose content of 1.5 to 2.5 times that of the hydrolysate, based on dry substance content.

6. A process as claimed in claim 4, wherein the xylose content of the xylose solution is over 1.5 times that of the hydrolysate, based on dry substance content.

7. A process as claimed in claim 6, wherein the xylose content of the xylose solution is over 2.5 times that of the hydrolysate, based on dry substance content.

8. A process as claimed in claim 4, further comprising recovering a xylose-solution having a xylose content of over 1.5 to 2.5 time that of the hydrolysate, based on dry substance content.

9. A process as claimed in claim 1, wherein the hydrolysate has a dry substance content of 3 to 50% by weight.

10. A process as claimed in claim 9, wherein the dry substance content of the hydrolysate is 8 to 25% by weight.

11. A process as claimed in claim 1, wherein the hydrolysate used as the nanofiltration feed has a dry substance content of less than 30% by weight.

12. A process as claimed in claim 1, wherein the hydrolysate has a xylose content of 5 to 95%, based on dry substance content.

13. A process as claimed in claim 12, wherein the hydrolysate has a xylose content of 15 to 55% by weight, based on the dry substance content.

14. A process as claimed in claim 12, wherein the hydrolysate has a xylose content of 15 to 40% by weight, based on the dry substance content.

15. A process as claimed in claim 12, wherein the hydrolysate has a xylose content of 8 to 27 by weight, based on the dry substance content.

16. A process as claimed in claim 1, wherein the hydrolysate of xylan-containing vegetable material is a spent liquor obtained from a pulping process.

17. A process as claimed in claim 16, wherein the spent liquor obtained from a pulping process is a spent sulphite pulping liquor.

18. A process as claimed in claim 17, wherein the spent sulphite pulping liquor is an acid spent sulphite pulping liquor.

19. A process as claimed in claim 17, wherein the spent sulphite pulping liquor is obtained from hardwood sulphite pulping.

20. A process as claimed in claim 16, wherein the spent liquor is a mother liquor obtained from crystallization of xylose.

21. A process as claimed in claim 1, wherein the nanofiltration is carried out at pH of 1 to 7.

22. A process as claimed in claim 21, wherein the nanofiltration is carried out at a pH of 3 to 6.5.

23. A process as claimed in claim 22, wherein the nanofiltration is carried out at a pH of 5 to 6.5.

24. A process as claimed in claim 1, wherein the nanofiltration is carried out at a pressure of 10 to 50 bar.

25. A process as claimed in claim 24, wherein the nanofiltration is carried out at a pressure of 15 to 35 bar.

26. A process as claimed in claim 1, wherein the nanofiltration is carried out at a temperature of 5–95° C.

27. A process as claimed in claim 26, wherein the nanofiltration is carried out at a temperature of 30 to 60° C.

28. A process as claimed in claim 1, wherein the nanofiltration is carried out with a flux of 10 to 100 liters/$m^2$h.

29. A process as claimed in claim 1, wherein the nanofiltration is carried out using a nanofiltration membrane selected from polymeric and inorganic membranes having a cut-off size of 100 to 2500 g/mol.

30. A process as claimed in claim 29, wherein the cut-off size of the nanofiltration membrane is 150 to 1000 g/mol.

31. A process as claimed in claim 30, wherein the cut-off size of the nanofiltration membrane is 150 to 500 g/mol.

32. A process as claimed in claim 29, wherein the nanofiltration membrane is selected from ionic membranes.

33. A process as claimed in claim 29, wherein the nanofiltration membrane is selected from hydrophobic and hydrophilic membranes.

34. A process as claimed in claim 29, wherein the nano filtration membrane is selected from cellulose acetate membranes, polyethersulfone membranes, sulfonated polyether sulphone membranes, polyester membranes, polysulfone membranes, aromatic polyamide membranes, polyvinyl alcohol membranes and polypiperazine membranes and combinations thereof.

35. A process as claimed in claim 34, wherein the nanofiltration membrane is selected from sulfonated polyether sulfone membranes and polypiperazine membranes.

36. A process as claimed in claim 34, wherein the nanofiltration membrane is selected from a polypiperazine membrane having a cut-off size of 200 g/mol, a permeability at 25° C. of 7–8 l/($m^2$h bar) and a NaCl retention of 70%, and a polyester-polysulfone membrane having a cut-off size of 150 to 300 g/mol, a permeability at 25° C. of 5.4 l/($m^2$h bar) and a $MaSO_4$ retention of 98% at 2 g/l.

37. A process as claimed in claim 29, wherein the nanofiltration membrane has a form selected from sheets, tubes, spiral membranes and hollow fibers.

38. A process as claimed in claim 29, wherein the nanofiltration membrane is selected from high shear type membranes.

39. A process as claimed in claim 29, wherein the nanofiltration membrane has been pretreated by washing.

40. A process as claimed in claim 39, wherein the washing includes a washing agent selected from ethanol, an alkaline detergent, or a combination thereof.

41. A process as claimed in claim 1, wherein the nanofiltration process is repeated at least once.

42. A process as claimed in claim 1, wherein the process is carried out batchwise or continuously.

43. A process as claimed in claim 1, wherein the process is carried out using a nanofiltration equipment including several nano filtration elements arranged in parallel or series.

44. A process as claimed in claim 1, further comprising one or more pretreatment steps.

45. A process as claimed in claim 44, wherein the one or more pretreatment steps are selected from ion exchange, ultrafiltration, chromatography, concentration, pH adjustment, filtration, dilution, crystallization and combinations thereof.

46. A process as claimed in claim 1, further comprising one or more post-treatment steps.

47. A process as claimed in claim 46, wherein the one or more post-treatment steps are selected from ion exchange, crystallization, chromatography, concentration, reverse osmosis and color removal.

48. A process as claimed in claim 46, wherein the one or more post-treatment steps includes a reduction step which converts xylose to xylitol.

49. A process as claimed in claim 1, wherein the solution enriched in xylose and recovered as the nanofiltration permeate also includes other pentose sugars.

50. A process as claimed in claim 49, wherein the other pentose sugars comprise arabinose.

* * * * *